US007822835B2

(12) United States Patent
Atkinson et al.

(10) Patent No.: US 7,822,835 B2
(45) Date of Patent: Oct. 26, 2010

(54) LOGICALLY CENTRALIZED PHYSICALLY DISTRIBUTED IP NETWORK-CONNECTED DEVICES CONFIGURATION

(75) Inventors: Robert G. Atkinson, Woodinville, WA (US); William T. Blank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 11/701,004

(22) Filed: Feb. 1, 2007

(65) Prior Publication Data

US 2008/0189397 A1 Aug. 7, 2008

(51) Int. Cl.
*G06F 15/173* (2006.01)
*G06F 17/30* (2006.01)
*G06F 3/12* (2006.01)

(52) U.S. Cl. .................. 709/221; 709/220; 709/222; 707/10; 358/1.15

(58) Field of Classification Search ......... 709/220–222; 358/1.15; 707/10
See application file for complete search history.

(56) References Cited

U.S. PATENT DOCUMENTS

| 6,101,499 | A | 8/2000 | Ford et al. |
| 6,396,815 | B1 | 5/2002 | Greaves et al. |
| 6,735,619 | B1 | 5/2004 | Sawada |
| 6,801,507 | B1 | 10/2004 | Humpleman et al. |
| 6,941,356 | B2 | 9/2005 | Meyerson |
| 6,996,613 | B1 | 2/2006 | Schroder |
| 7,124,356 | B1 | 10/2006 | Alsafadi et al. |
| 7,200,649 | B1* | 4/2007 | Batke et al. .................. 709/222 |
| 2003/0009552 | A1* | 1/2003 | Benfield et al. ............. 709/224 |
| 2003/0177271 | A1 | 9/2003 | Park |
| 2004/0268407 | A1 | 12/2004 | Sparrell et al. |
| 2005/0076150 | A1 | 4/2005 | Lee et al. |
| 2006/0101273 | A1 | 5/2006 | Tan et al. |
| 2006/0165015 | A1 | 7/2006 | Melick et al. |
| 2007/0067302 | A1* | 3/2007 | Bailey et al. .................. 707/10 |
| 2007/0268516 | A1* | 11/2007 | Bugwadia et al. .......... 358/1.15 |

FOREIGN PATENT DOCUMENTS

JP 2006115033 A * 4/2006

OTHER PUBLICATIONS

Minseok Kwon;Topology-Aware Overlay Networks for Group Communication;ACM;2002;1-58113-512-2/02/0005;127-136.*
"CL100 RS-232/IR Network Interface", http://www.netstreams.com/commproducts.aspx?ID=2.

(Continued)

*Primary Examiner*—Ashok B Patel
*Assistant Examiner*—Evans Desrosiers (57) ABSTRACT

A logically centralized physically distributed Internet protocol (IP) network-connected devices configuration is disclosed. The technology initially receives configuration information regarding an IP network-connected devices configuration. The configuration information is then disseminated to a plurality of devices coupled with the IP network-connected devices configuration. At least a portion of the IP network-connected devices configuration with a related timestamp is then stored on any of the plurality of devices having a datastore thereon. In so doing, the IP network-connected devices configuration is physically distributed and at least partially replicated such that when a comparison of a status information with respect to at least one of the network-connected devices, the status information having a most recent timestamp associated therewith is relied upon.

20 Claims, 6 Drawing Sheets

OTHER PUBLICATIONS

Bell et al., "A call for the home media network", Date: Jul. 2002, pp. 71-75, vol. 45, Issue 7, ACM Press, New York, USA, http://delivery.acm.org/10.1145/520000/514237/p71-bell.pdf?key1=514237&key2=6298452611&coll=GUIDE&dl=GUIDE&CFID=3703826&CFTOKEN=81569815.

Chen, Walter Y., "Emerging Home Digital Networking Needs", http://www.cs.columbia.edu/~hgs/papers/others/1997/Chen9709_Emerging.ps.gz.

Ogawara et al., "Home Network Service Management Technologies", Date: Jan. 2005, vol. 3 No. 1, http://www.ntt.co.jp/tr/0501/files/ntr200501017.pdf.

\* cited by examiner

RECEIVING CONFIGURATION INFORMATION REGARDING AN IP NETWORK CONNECTED DEVICES CONFIGURATION.
510

DISSEMINATING THE CONFIGURATION INFORMATION TO A PLURALITY OF DEVICES COUPLED WITH THE IP NETWORK CONNECTED DEVICES CONFIGURATION.
520

STORING AT LEAST A PORTION OF THE IP NETWORK CONNECTED DEVICES CONFIGURATION WITH A RELATED TIMESTAMP ON ANY OF THE PLURALITY OF DEVICES HAVING A DATASTORE THEREON, THE STORING ALLOWING THE IP NETWORK CONNECTED DEVICES CONFIGURATION TO BE PHYSICALLY DISTRIBUTED AND AT LEAST PARTIALLY REPLICATED SUCH THAT WHEN A COMPARISON OF A STATUS INFORMATION WITH RESPECT TO AT LEAST ONE OF THE NETWORK CONNECTED DEVICES, THE STATUS INFORMATION HAVING A MOST RECENT TIMESTAMP ASSOCIATED THEREWITH IS RELIED UPON.
530

```
┌─────────────────────────────────────────────┐
│  COUPLE IP COMPONENT WITH THE IP NETWORK.   │
│                    602                       │
└─────────────────────────────────────────────┘
                      │
                      ▼
┌─────────────────────────────────────────────┐
│ UNIQUELY IDENTIFY THE IP COMPONENT WITHIN    │
│              THE IP NETWORK.                 │
│                    604                       │
└─────────────────────────────────────────────┘
                      │
                      ▼
┌─────────────────────────────────────────────┐
│ ESTABLISH SECURITY FOR THE IP COMPONENT      │
│           WITHIN THE IP NETWORK.             │
│                    606                       │
└─────────────────────────────────────────────┘
                      │
                      ▼
┌─────────────────────────────────────────────┐
│  BROADCAST IP COMPONENT STATUS AND IDENTITY  │
│          THROUGHOUT THE IP NETWORK.          │
│                    608                       │
└─────────────────────────────────────────────┘
                      │
                      ▼
┌─────────────────────────────────────────────┐
│ BEGIN STORING IP NETWORK INFORMATION AND     │
│         STATUS ON THE IP COMPONENT.          │
│                    610                       │
└─────────────────────────────────────────────┘
```

FIG. 6

LOGICALLY CENTRALIZED PHYSICALLY DISTRIBUTED IP NETWORK-CONNECTED DEVICES CONFIGURATION

BACKGROUND

Presently, computer systems are used throughout daily life including both work and entertainment. For example, many people have a computing system in the home. Moreover, the utilization of home computers for various forms of entertainment such as, listening to music, watching television, surfing the Internet, online collaboration while playing a video game and the like is steadily growing.

Additional advances in computer processing power, hard drive size, and the like, have promoted further integration with household activities such as audio and video systems. For example, a user may connect a television, speakers, surveillance cameras, or a plurality of other devices into a computing network. Then, for example, a user can play music to different locations throughout the house by simply selecting the desired functionality on the computing system. In many cases, the entertainment provided by the computer, e.g., the audio or video, may be received from the Internet in the form of streaming media, downloaded music, on demand videos and the like.

Although the ability to run a home sound system and the like through a computer network is convenient there are still a number of downfalls. For example, if the computing system is rendered inoperable, the entire network managed from the computer also becomes inoperable. That is, a virus, computer error, spilled drink or the like is capable of causing deleterious computer system failure and therefore complete network failure. Moreover, if the computer is fatally lost and unrecoverable, the entire network-connected devices configuration will also be inaccessible, fatally lost and/or unrecoverable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A logically centralized physically distributed Internet protocol (IP) network-connected devices configuration is disclosed. The technology initially receives configuration information regarding an IP network-connected devices configuration. The configuration information is then disseminated to a plurality of devices coupled with the IP network-connected devices configuration. At least a portion of the IP network-connected devices configuration with a related timestamp is then stored on any of the plurality of devices having a datastore thereon. In so doing, the IP network-connected devices configuration is physically distributed and at least partially replicated such that when a comparison of a status information with respect to at least one of the network-connected devices, the status information having a most recent timestamp associated therewith is relied upon.

Moreover, the present technology provides a multi-mastered approach to managing an IP network-connected devices configuration. For example, because any of the devices may act as a master within IP network-connected devices configuration at any time, the problems associated with single master network configurations are removed. That is, there is no concern of a single master intermittently failing or otherwise deleteriously affecting the operations of the device within the network.

In one embodiment, the present technology resolves any conflict resulting from any or all of the devices within IP network-connected devices configuration acting as a master at any given time with the utilization of a time stamp associated with the status information.

As a result, the present technology provides a system and method for a logically centralized physically distributed IP network-connected devices configuration that is accessible by any device that can access a network such as the Internet. Moreover, the present technology allows an IP network-connected devices configuration to be managed centrally, while the actual IP network-connected devices configuration remains physically distributed and at least partially replicated. In so doing, a single device failure in the IP network-connected devices configuration will not result in a failure of the IP network-connected devices configuration because no single device maintains the IP network-connected devices configuration.

DESCRIPTION OF THE DRAWINGS

The accompanying drawings, which are incorporated in and form a part of this specification, illustrate embodiments of the technology for providing a logically centralized physically distributed IP network-connected devices configuration and, together with the description, serve to explain principles discussed below.

The drawings referred to in this description should be understood as not being drawn to scale except if specifically noted.

DETAILED DESCRIPTION

Reference will now be made in detail to embodiments of the present technology for providing a logically centralized physically distributed IP network-connected devices configuration, examples of which are illustrated in the accompanying drawings. While the technology will be described in conjunction with various embodiments, it will be understood that they are not intended to limit the present technology for providing a logically centralized physically distributed IP network-connected devices configuration to these embodiments. On the contrary, the presented technology is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for providing a logically centralized physically distributed IP network-connected devices configuration. However, the present technology for providing a logically centralized physically distributed IP network-connected devices configuration may be practiced without these specific details. In other instances, well known methods, procedures, devices, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for providing a logically centralized physically distributed IP network-connected devices configuration is also well suited to the use of other computer systems such as, for example, optical and mechanical computers. Additionally, it should be understood that in embodiments of the present technology for providing a logically centralized physically distributed IP network-connected devices configuration, one or more of the steps can be performed manually.

Example Computer System Environment

Figure 1:
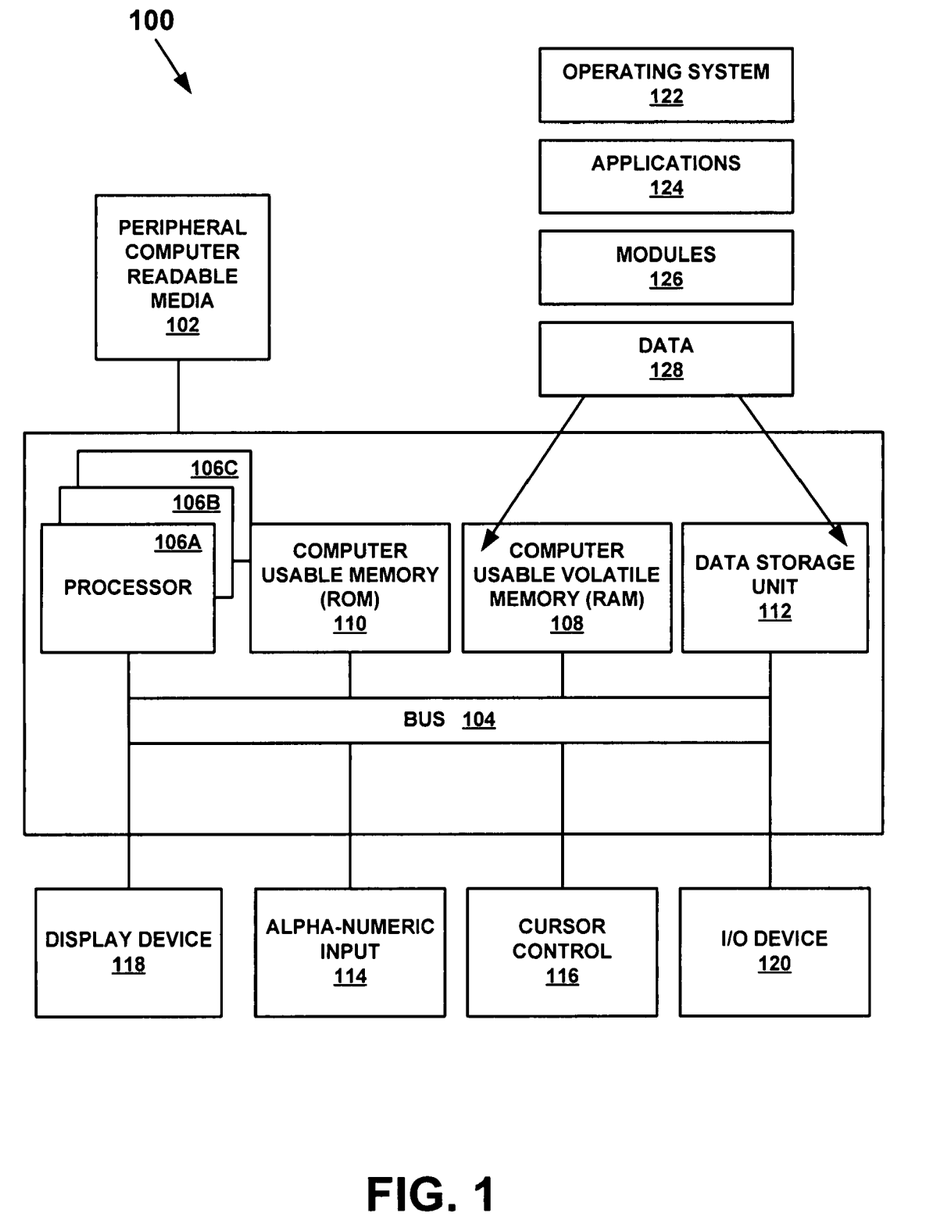
FIG. 1 is a diagram of an exemplary computer system used in accordance with embodiments of the present technology for providing a logically centralized physically distributed IP network-connected devices configuration.

With reference now to FIG. 1, portions of the technology for providing a logically centralized physically distributed IP network-connected devices configuration are composed of computer-readable and computer-executable instructions that reside, for example, in computer-usable media of a computer system. That is, FIG. 1 illustrates one example of a type of computer that can be used to implement embodiments, which are discussed below, of the present technology for providing a logically centralized physically distributed IP network-connected devices configuration.

FIG. 1 illustrates an exemplary computer system 100 used in accordance with embodiments of the present technology for providing a logically centralized physically distributed IP network-connected devices configuration. It is appreciated that system 100 of FIG. 1 is exemplary only and that the present technology for providing a logically centralized physically distributed IP network-connected devices configuration can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for providing a logically centralized physically distributed IP network-connected devices configuration is found below.

Referring still to FIG. 1, various other devices are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for providing a logically centralized physically distributed IP network-connected devices configuration, for example, is stored as an application 124 or module 126 in memory locations within RAM 108 and memory areas within data storage unit 112.

The computing system 100 is only one example of a suitable computing environment and is not intended to suggest any limitation as to the scope of use or functionality of the present technology. Neither should the computing environment 100 be interpreted as having any dependency or requirement relating to any one or combination of devices illustrated in the exemplary computing system 100.

The present technology is operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, devices, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

In one embodiment, the present technology provides a logically centralized physically distributed IP network-connected devices configuration. The present schema is referred to herein as "Lifeboard". In general, Lifeboard provides a unifying infrastructure for an IP network-connected devices configuration's digital devices.

For example, the IP network-connected devices configuration may include IP devices such as speakers, lights, receivers, and other networked devices which may be contained in a room (or all of the rooms) in a building. Moreover, the IP network-connected devices configuration schema may include the volume and mute settings for a specific room's speakers, the connectivity between devices such as digital lights and the switches that control them, and so on. The base schema is rich, in that it has built-in models for a wide range of related devices and phenomena; it is also extensible. That is, the schema allows new kinds of devices and concepts to be integrated in a first-class way at a later date.

In one embodiment, the present technology distributes the physical attributes, settings, location and the like of each of the devices coupled with an Internet protocol (IP) network among any of the devices coupled with the IP network-connected devices configuration having storage capabilities associated therewith. In other words, the logically centralized, physically distributed and at least partially replicated software architecture and implementation (e.g., Lifeboard) is disseminated on various devices in the IP network-connected devices configuration to collectively provide a robust, zero-maintenance, ubiquitously-replicated storage service for the instance of the Lifeboard schema representing the digital configuration information of the household.

In other words, the networked devices of the IP network-connected devices configuration (e.g., a home system) utilize the Lifeboard store to cohesively manage persistent state on behalf of the IP network-connected devices configuration's digital devices. For example, in one embodiment, the data of a home's Lifeboard is maintained as a single logical instance of an XML schema. In another embodiment, at least a partial replica of the XML data will be deposited on each Lifeboard device that includes writeable persistent storage such as a hard disk or flash memory.

In one embodiment, the Lifeboard scheme utilizes multi-casting as the communication method between the devices in the network. In so doing, the Lifeboard is accessible and interactive in a logically centralized manner. For example, in one embodiment, Lifeboard is utilized in conjunction with digital devices, that are mutually accessible to user datagram protocol (UDP) multicast and unicast, with sufficient bandwidth so that communications from each device in the network can reach all other devices in the network in a short time with few retransmissions. That is, the Lifeboard schema is entirely agnostic to the particular networking technology(s) in use, be it wired Ethernet, 802.11 wireless, HomePlug power-line carrier, or the like. However, in another embodiment, the Lifeboard scheme may utilize a number of unicasts instead of, or in conjunction with, multicasting as the communication method between the network-connected devices.

For example, when a user access the IP network-connected devices configuration from any IP network-connected devices configuration accessible device, a plurality of options exist. The accessing device may request a complete IP network-connected devices configuration status. Then, all of the devices in the network having at least a portion of the IP network-connected devices configuration information thereon will multicast the information on the IP network-connected devices configuration. The accessing device will receive the information and perform a comparison to ensure that any conflicting information is resolved. The accessing device will then present the resulting information either locally or to another device (e.g., a TV screen, monitor, personal digital assistant (PDA) etc.) on the network. The user may then navigate among the results and review or modify any device settings accordingly.

In another embodiment, the user may be focused only on a single device or location and not the entire IP network-connected devices configuration. Thus, the user may simply request the status of the device or location and then perform any desired adjustments to the device after receiving the deconflicted results. In one embodiment, the adjustment to the device is multicast across the IP network-connected devices configuration and any or all of the devices having storage locations thereon will store and update the information accordingly.

Architecture

Figure 2:
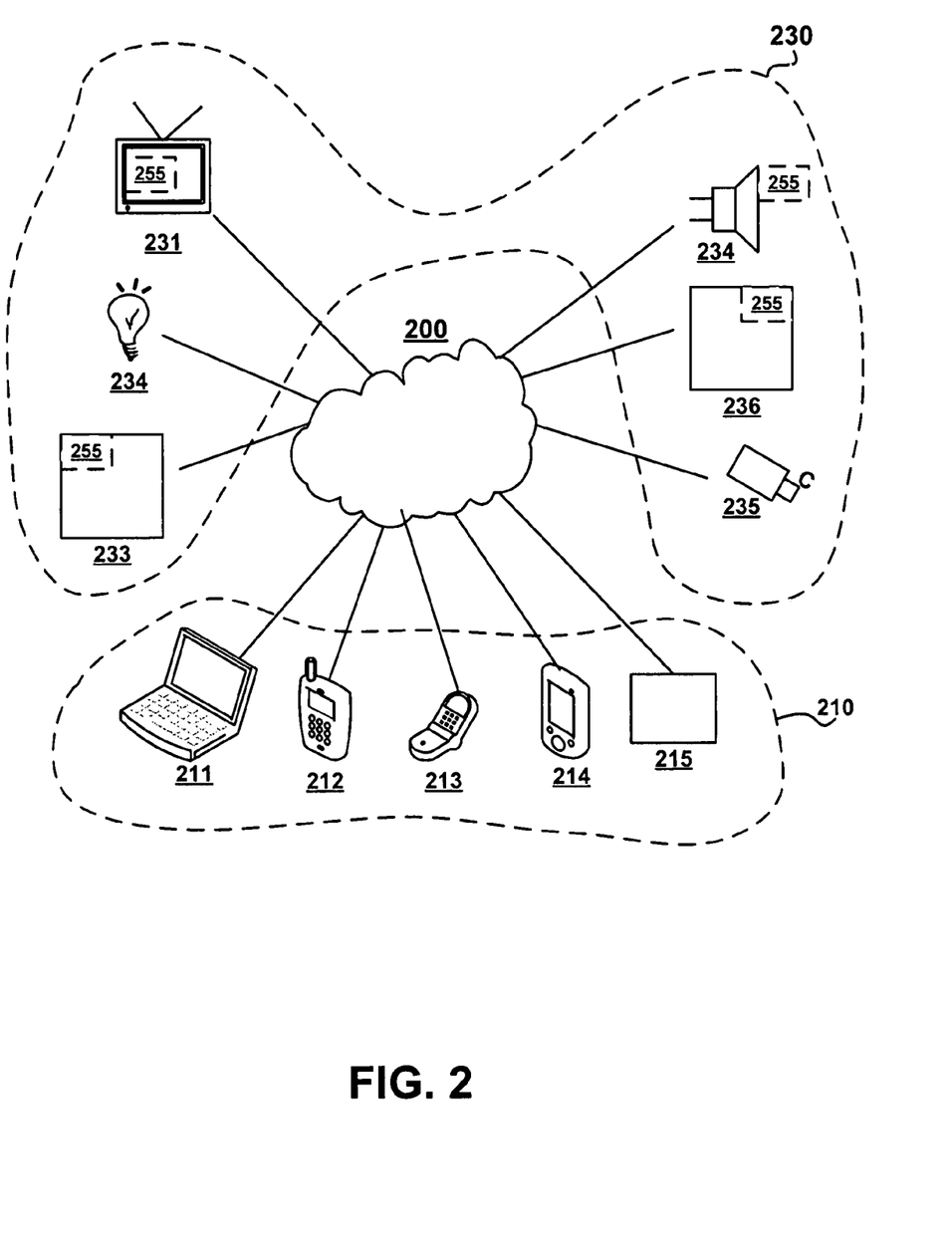
FIG. 2 is a block diagram of an exemplary IP network-connected devices configuration in accordance with one embodiment of the present technology.

With reference now to FIG. 2, a block diagram of an exemplary IP network-connected devices configuration 200 is shown in accordance with one embodiment of the present technology. In one embodiment, IP network-connected devices configuration 200 includes at least one network access device 210 and a plurality of networked devices 230. In general, network access device 210 may be any type of device that is capable of accessing IP network-connected devices configuration 200. For example, network access device 210 may be a personal computer 211, a remote control 212, a mobile phone 213, a personal digital assistant 214, an input device 215 for networked device 230 (e.g., a button on networked devices 230) and the like.

In one embodiment, networked devices 230 include devices such as a television 231, a light source 232, a personal video recorder 233, a speaker 234, a camera 235, other audio and/or video device 236 and the like that are coupled to the IP network-connected devices configuration 200. In one embodiment, the networked devices 230 and network access device 210 may be wired to the network or wirelessly coupled with the IP network-connected devices configuration 200. Moreover, in one embodiment, any or all of the networked devices 230 may include a Lifeboard depot 255. In general, Lifeboard depot 255 refers to a storage area in any of networked devices 230 which is capable of storing some or all of IP network-connected devices configuration 200's Lifeboard data. In one embodiment, the lifeboard data is extensible mark-up language (XML). However, the present technology is well suited to utilizing a plurality of programming languages. The utilization of XML herein is merely for purposes of brevity and clarity.

In one embodiment, each networked device 230 shares a highly-synchronized high-precision clock known as the "eco-system clock". Furthermore, each update to the Lifeboard XML data is persistently tagged with the then-current reading of this clock. In a subsequent query, the XML data returned by any of the several depots in the IP network-connected devices configuration is recursively merged to select the latest data according the values of these clock readings. In this way, stale data returned by a depot that was offline while updates were made can be detected as such, and a single logical instance of the Lifeboard data can be seamlessly projected.

However, not all networked devices 230 need to persistently store an entire copy of the Lifeboard data. In other words, each XML element contained in a Lifeboard may be classified as either volatile or non-volatile Lifeboard data. In general, non-volatile Lifeboard data forms the bulk of Lifeboard instances. Non-volatile data is stored in writeable persistent storage such as a hard disk or flash memory by depots who do not understand the semantic structure of the data they are storing beyond the fact that it is formatted as XML. Such depots are referred to herein as "generic depots".

In contrast, volatile Lifeboard data is maintained by depots that understand the semantic structure of the XML and are referred to herein as "specialized depots". For example, some parts of the Lifeboard schema mirror part of the internal state of a certain device. For example, the device may be a specialized depot for a part of the Lifeboard that reflects its internal state even if the device lacks any persistent storage. In one embodiment, this may be accomplished by having the device actively respond to queries regarding its state using the then-current time on the eco-system clock as the timestamp for the response. Thus, by using the current time as the timestamp, the response from the actual device will be considered as fresh of fresher than any responses from other networked devices 230. In general, specialized depots can operate as such because they have knowledge external to the Lifeboard itself as to what the current, most up-to-date contents of the device.

For example, a hypothetical Lifeboard device digital thermometer might choose to be a specialized depot and manifest its current measured temperature as volatile Lifeboard data. When another device queries for that data, the thermometer can respond authoritatively, since it knows that the data that it is providing is the most up-to-date.

Thus, in one embodiment, the generic depot will store all the non-volatile data in a Lifeboard instance, whereas volatile data is manifest by a specialized depot. However, it is entirely possible that a specialized depot may manifest non-volatile data as well (in which case it will also be stored by generic depots as updates or query responses are observed). In so doing, a specialized depot can provide the latest up-to-date information while it is online yet generic depots will still provide the static last-observed value for use when the specialized depot is offline.

Figure 3:
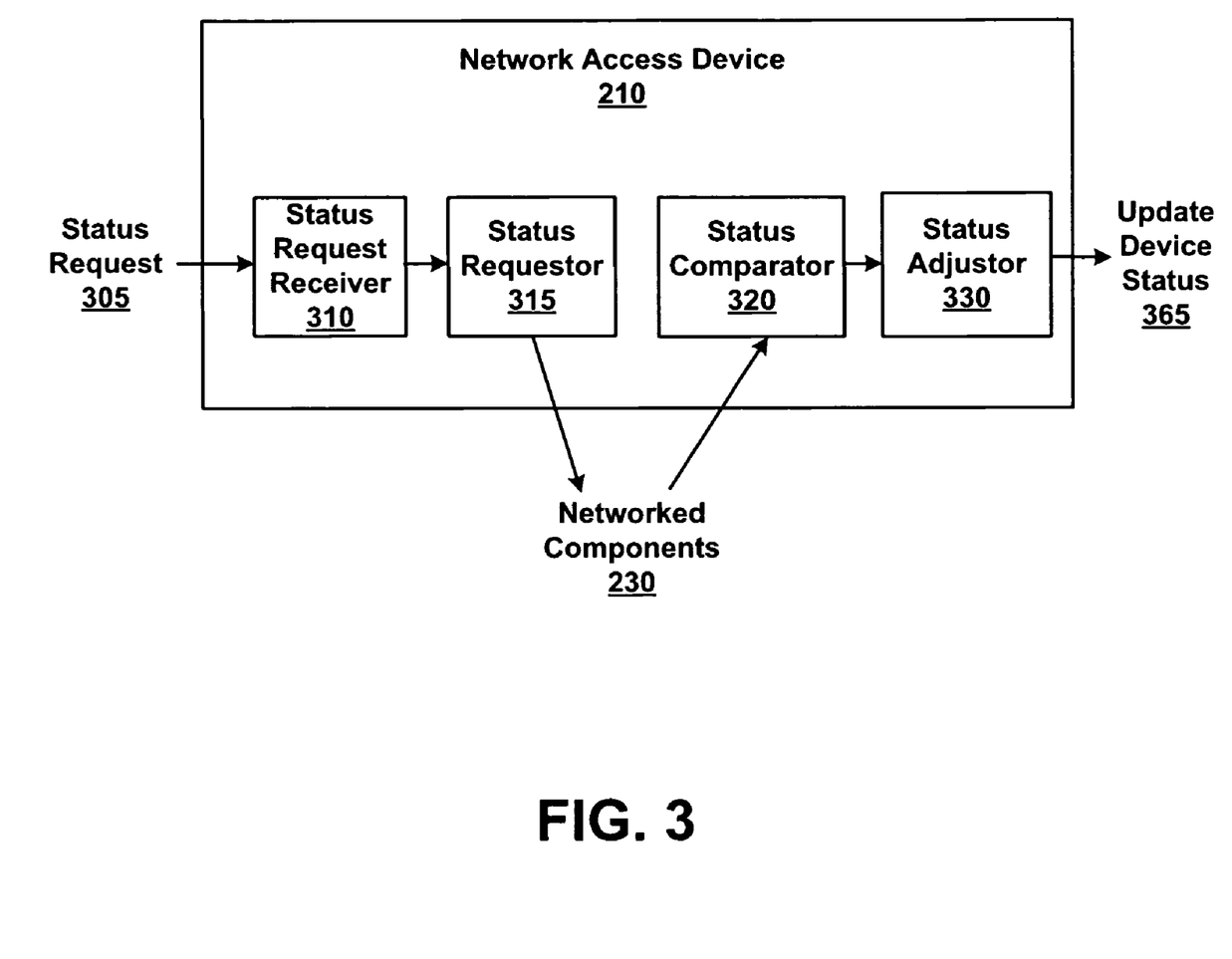
FIG. 3 is a block diagram of an exemplary decentralized IP network-connected devices configuration manager in accordance with one embodiment of the present technology.

Referring now to FIG. 3, a block diagram of an exemplary network access device 210 is shown in accordance with one embodiment of the present technology. In general, network access device 210 includes a status request receiver 310, a status requestor 315, a status comparator 320 and a status adjustor 330.

In one embodiment, status request receiver 310 receives a status request 305, such as, a request for the volume of a specific speaker 234 (or specific room having speakers therein). Status request receiver 310 then passes the status request 305 to status requester 315 which multicasts the request to networked devices 230 over the IP network-connected devices configuration 200. After receiving the multicast request for information, each of the networked devices 230 access Lifeboard depot 255 and return any information they have regarding the request in a multicast on IP network-connected devices configuration 200. Moreover, each of the networked devices 230 returning information will include a timestamp related to when the information was most recently updated.

Status comparator 320 will receive the multicasts of information provided by networked devices 230 and perform a comparison between the results. In one embodiment, the comparison is based on the most recent timestamp, the title of the networked device 230 providing the information, and the like. For example, if the specific speaker 234 in question (or specific room in question) actively responds to the status request query regarding its state, then the title of the device, e.g., speaker 234, may be utilized by status comparator 320 as a selection criteria. That is, the volume setting provided by speaker 234 will be selected by status comparator 320 as the actual volume of speaker 234 due to the authority of speaker 234.

In another embodiment, when speaker 234 provides its own status information the current time on the eco-system clock is selected as the timestamp for the information either by speaker 234 or status comparator 320. By using the current time timestamp, the response from the actual device in question (e.g., speaker 234) will be considered as fresh of fresher than the responses from the rest of networked devices 230.

Once the comparison is performed and the status of speaker 234 is established, network access device 210 may present the information, such as on a display or the like. However, network access device 210 may also provide the ability for a user to adjust the status of speaker 234. If a status adjustment is desired, status adjustor 330 will receive the input for the desired adjustment and will multicast the status adjustment over IP network-connected devices configuration 200.

For example, a user may have requested the status of speaker 234 and the initial status of speaker 234 may be returned as a 4 on a scale of 1 to 10. The user may then instruct network access device 210 to adjust the volume to 2. Status adjustor 330 will receive the adjustment request and multicast the adjustment of the volume of speaker 234 on IP network-connected devices configuration 200. In so doing, the volume of speaker 234 will be adjusted when speaker 234 receives the multicast. Moreover, any or all online Lifeboard depots 255 will also be updated with the current speaker 234 volume and a current timestamp. Thus, not only is the volume of speaker 234 adjusted, but the distributed and replicated IP network-connected devices configuration 200 (e.g., Lifeboard) is also updated.

Moreover, because the IP network-connected devices configuration 200 is logically centralized and physically distributed, once a device is introduced to the network, the device will remain a part of the IP network-connected devices configuration 200 regardless of its power state. For example, if a first device, such as speaker 235, is off, the IP network-connected devices configuration 200 will be able to respond to a query regarding speaker 235 with a result such as "speaker 235 is off". Thus, unlike other network-connected device configurations that show no devices present when the device maintaining the configuration is shut off, when the power is off for a device utilizing the present technology, the device and its status is still maintained throughout the IP network-connected devices configuration 200.

In so doing, the present technology allows a user to pre-program devices within the IP network-connected devices configuration 200 while also managing power state and power consumption. For example, a user may desire a tuner and some number of speakers to automatically turn on at 8 pm. Unlike prior methods where the speakers and tuner must remain in a powered state to perform the desired task, the present technology allows devices to be powered on or off at certain times. For example, the speakers and tuner may initially be off. At the designated time, the present technology will provide a wake-up to the devices, such as the speakers and the tuner. The wake-up will result in the speakers and tuner being powered up and set to the proper state conditions. Thus, as stated herein, the present technology allows IP network-connected devices configuration 200 to track the state of an associated device regardless of the power state of the device in question.

Figure 4:
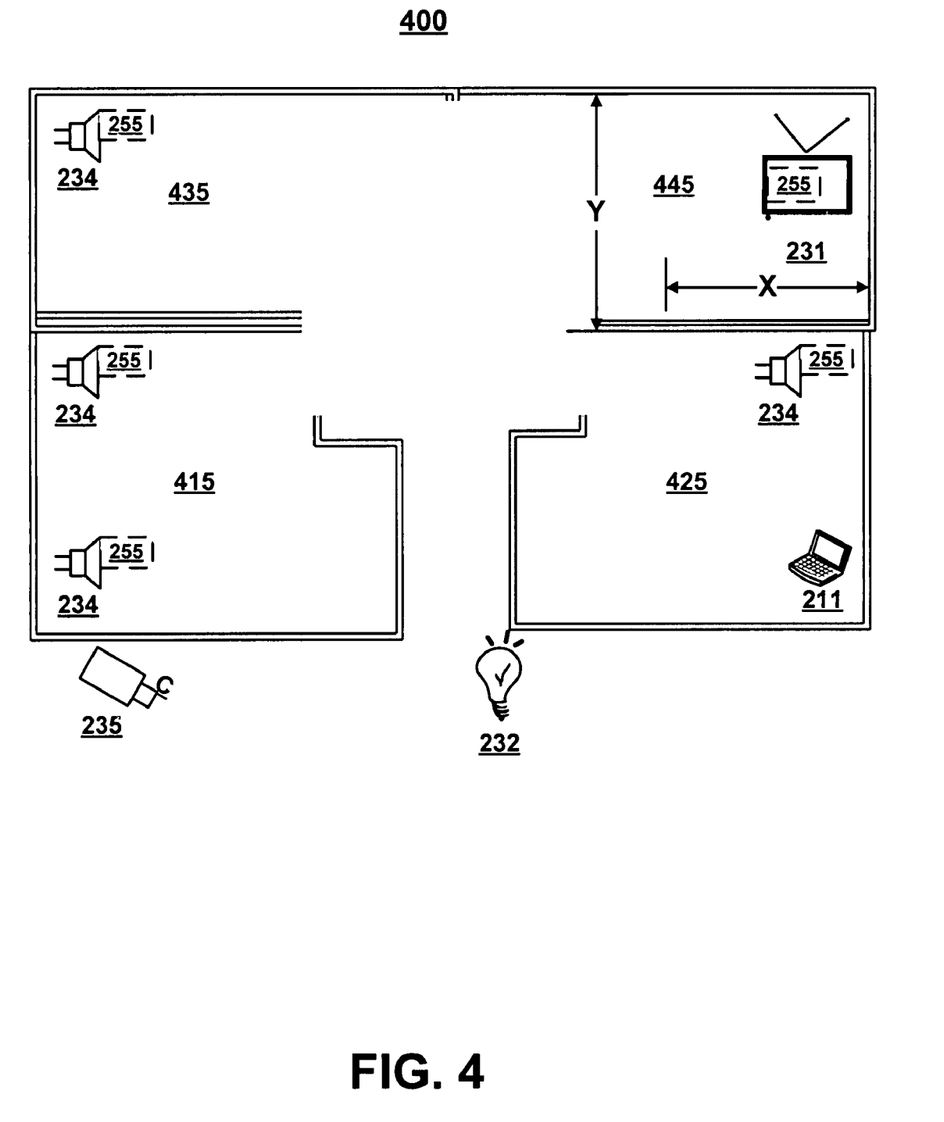
FIG. 4 is a block diagram of an exemplary floor plan having a plurality of IP network-connected devices configurations laid out therein is shown in accordance with one embodiment of the present technology.

With reference now to FIG. 4, a block diagram of an exemplary floor plan 400 having a plurality of IP network-connected devices laid out therein is shown in accordance with one embodiment of the present technology. In general, floor plan 400 is a structure such as a house, a business, a building or the like. Basically, floor plan 400 is separated into four areas, e.g., rooms 415, 425, 435 and 445. In one embodiment, floor plan 400 illustrates a number of possibilities for defining the networked devices 230 within IP network-connected devices configuration 200.

For example, with respect to room 425, networked devices 230 may be defined by specific devices, e.g., speaker 234 and personal computer 211 or may be defined as room 425. Moreover, as shown in room 445, the X- and Y-dimensions of room 445 may be used to more exactly define the location of the networked devices 230, e.g., television 231. As such, the Lifeboard data description regarding the IP network-connected devices configuration 200 may be as detailed as a user desires. For example, if a user wants to merely connect a device such as speaker 234 to the IP network-connected devices configuration 200, the connection is performed as described in FIG. 6 and the speaker 234 is operational.

However, if the user desires to be more specific, such as providing the room 425 in which speaker 234 will be located, the location of speaker 234 within the room 425, the type of speaker 234, the layout of room 425, the dimensions of room 425, or any other characteristics, Lifeboard is more than capable of storing, presenting and utilizing the information. In other words, the Lifeboard schema described herein may be as detailed as a user desires.

In another embodiment, the information previously stated as being provided by the user, e.g., speaker 234 characteristics, room layout, etc. may be imported to Lifeboard via the Internet, the devices own memory, or any other device coupled with the IP network-connected devices configuration 200. For example, a laser measuring device may be coupled with IP network-connected devices configuration 200 and may be used to define the characteristics of a room or rooms within floor plan 400.

Operation

Figure 5:
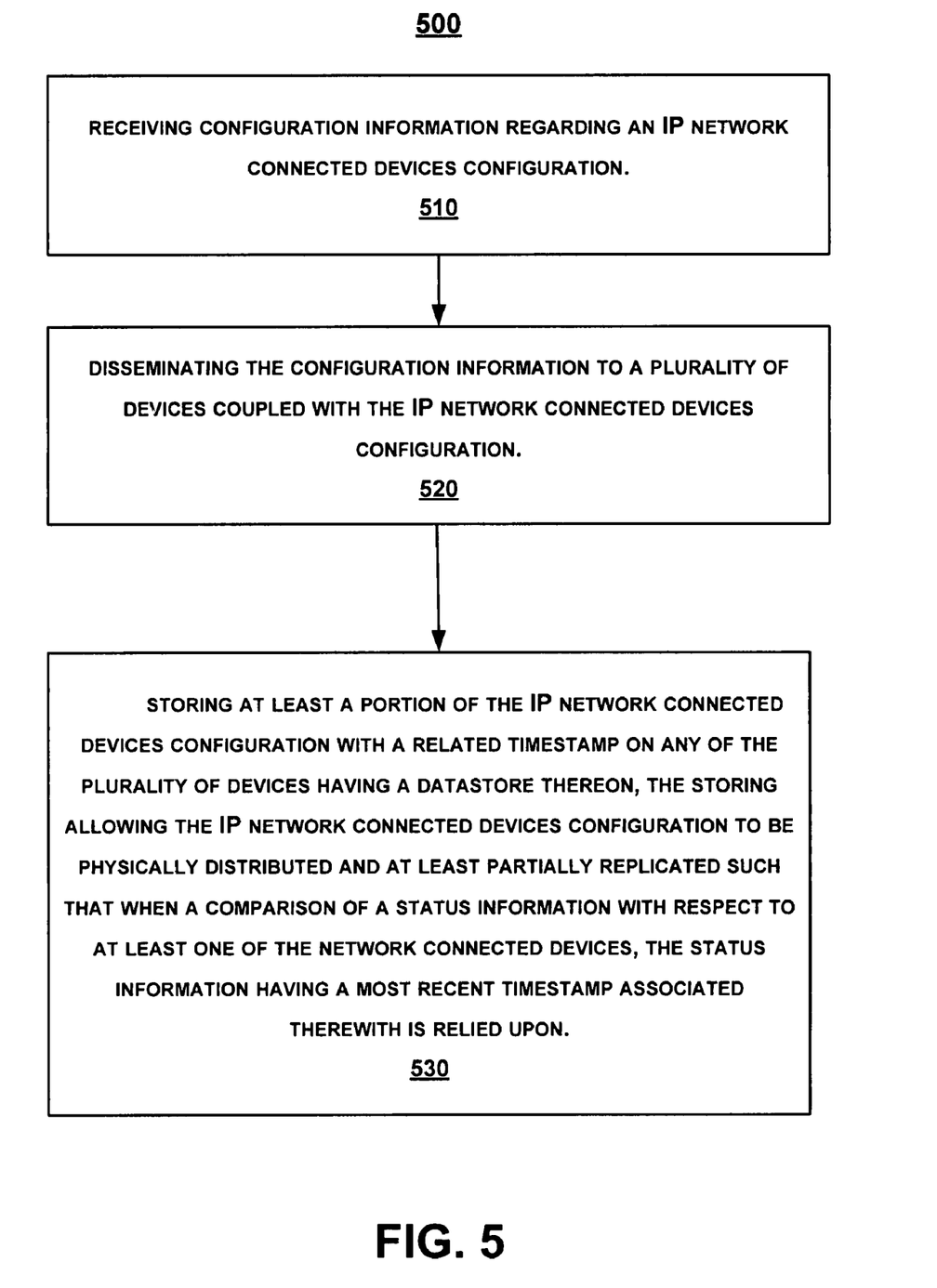
FIG. 5 is a flowchart of an exemplary method for providing a logically centralized physically distributed IP network-connected devices configuration in accordance with one embodiment of the present technology.

Referring now to FIG. 5, a flowchart of an exemplary method for providing a logically centralized physically distributed IP network-connected devices configuration 200 is shown in accordance with one embodiment of the present technology.

With reference now to 510 of FIG. 5 and to FIG. 2, one embodiment receives configuration information regarding IP network-connected devices configuration 200. In one embodiment, the configuration information of IP network-connected devices configuration 200 is received as a device type and device status. For example, the configuration information of IP network-connected devices configuration 200 may include television 231 with a channel range of 1-600, volume range of 0-10, two digital inputs, one digital output, one analog input and a stereo connection. Furthermore, the configuration information may include additional details specific to television 231 such as the inputs and outputs being utilized, the actual volume setting, the actual channel setting, and the like.

In another embodiment, e.g., with respect to FIG. 4, the configuration information of IP network-connected devices configuration 200 is received in a device by room format. For example, the configuration information of IP network-connected devices configuration 200 may include room 415 having two speakers 234 therein. Furthermore, the configuration information may include additional information specific to speakers 234 such as the actual volume setting, the specific location of speakers 234 within room 415, and the like.

Referring now to 520 of FIG. 5 and to FIG. 2, one embodiment disseminates the configuration information to a plurality of devices, such as networked devices 230, coupled with IP network-connected devices configuration 200. In one embodiment, multicasting is utilized to perform the dissemination of the configuration information. That is, the configuration information is multicast over IP network-connected devices configuration 200 to each of networked devices 230.

With reference now to 530 of FIG. 5 and to FIG. 2, one embodiment stores at least a portion of IP network-connected devices configuration 200 with a related timestamp on any of the plurality of devices having a datastore thereon, the storing allowing the IP network-connected devices configuration to be physically distributed and at least partially replicated such that when a comparison of a status information with respect to at least one of the network-connected devices, the status information having a most recent timestamp associated therewith is relied upon.

In one embodiment, the storing of information at Lifeboard depot 255 on any or all networked devices 230 allows the IP network-connected devices configuration 200 to be physically distributed and at least partially replicated. For example, any networked devices 230 on-line during the broadcast will receive IP network-connected devices configuration 200 information. Moreover, any networked devices 230 having Lifeboard depot 255 thereon will be able to store any or all of the IP network-connected devices configuration 200 information.

By storing the Lifeboard on a plurality of networked devices 230, the present technology provides resiliency through redundancy. That is, when several systems store their state and configuration information in the Lifeboard, it is critical that the overall system be robust in the face of failures.

To this end, the data of the Lifeboard is redundantly stored on several of networked devices 230. This redundancy is realized because it will usually be the case that each of the networked devices 230 in the home with at least a modicum of persistent storage will persistently store a copy of some or all of the Lifeboard schema.

Moreover, the present technology provides a multi-mastered approach to managing IP network-connected devices configuration 200. For example, because any of the devices may act as a master within IP network-connected devices configuration 200 at any time, the problems associated with single master network configurations are removed. That is, there is no concern of a single master intermittently failing or otherwise deleteriously affecting the operations of the device within the network.

Moreover, in one embodiment, any conflict resulting from any or all of the devices within IP network-connected devices configuration 200 acting as a master at any given time is resolved with the utilization of the time stamp associated with the status information. In other words, because the status information has an associated timestamp, conflict resolution between two conflicting status reports is performed by evaluating the timestamps.

In addition, as described herein, accessing or updating the configuration information is also performed in a logically centralized fashion. For example, with reference to FIG. 2, a first device, e.g., light bulb 232, coupled with IP network-connected devices configuration 200, is selected via network access device 210 for update. Once the light bulb 232 is selected, a multicast is performed by network access device 210 requesting the status information of light bulb 232.

In one embodiment, each of the online networked devices 230 will receive the multicast status request. Moreover, any of the networked devices 230 having a datastore, e.g., Lifeboard depot 255, thereon, will review the datastore for status information regarding light bulb 232. Any of the networked devices 230 finding status information regarding light bulb 232 will then perform a multicast of the status information regarding light bulb 232 over IP network-connected devices configuration 200. In one embodiment, a timestamp of when the status information regarding light bulb 232 was updated is included in the multicast of the status information regarding light bulb 232.

Due to the nature of multicasting, network access device 210 will receive each multicast of status information regarding the first device from each of the plurality of networked devices 230 that provided a response. A comparison of the received status information regarding light bulb 232 is then performed. In one embodiment, the actual status information regarding light bulb 232, selected from the plurality of multicasts, is established based on a most recent timestamp when conflicting status information is received.

In another embodiment, the actual status information regarding light bulb 232 is established based on the name of the networked device providing the status information. For example, if light bulb 232 provided a multicast of its own status information, then status comparator 320 of FIG. 3 may simply select the status information provided from light bulb 232, regardless of any timestamp. In another embodiment, the timestamp of the status information provided from light bulb 232 may be updated to the freshest possible timestamp by light bulb 232 during transmission or status comparator 320 after reception.

In addition, each of the networked devices 230 will also receive every multicast of status information regarding light bulb 232. In one embodiment, each of the networked devices 230, having a datastore thereon, will compare the timestamp of each received multicast of status information regarding light bulb 232 with the timestamp associated with its own status information. If the timestamp of any of the multicasts of status information is fresher than the timestamp in the device's own datastore, then the device may update its own datastore by replacing the older stored status information with the fresher received status information.

In so doing, not only is network access device 210 able to compare and select the freshest status information, but the disseminated Lifeboard data files are also able to be updated in an automated fashion. In other words, while some amount of human interaction may be involved with the introduction of new devices to IP network-connected devices configuration 200 or the intentional reconfiguration of device interconnection, Lifeboard itself requires no human maintenance or interaction. For example, networked devices 230 that redundantly store the Lifeboard data may come and go, but at any given instant networked devices 230 presently online automatically mutually discover each other and cooperate to provide a unified, cohesive view of the Lifeboard's data. In other words, from the user's perspective, the Lifeboard is "just there."

In one embodiment, after receiving the status of light bulb 232, any adjustments to the status of light bulb 232 will also be multicast over IP network-connected devices configuration 200. In so doing, not only will the status of light bulb 232 be adjusted, e.g., turn it up, down, off, set timer, etc., but the multicasting will also provide a method for updating the datastore for any of the plurality of networked devices 230 having the datastore thereon.

Figure 6:
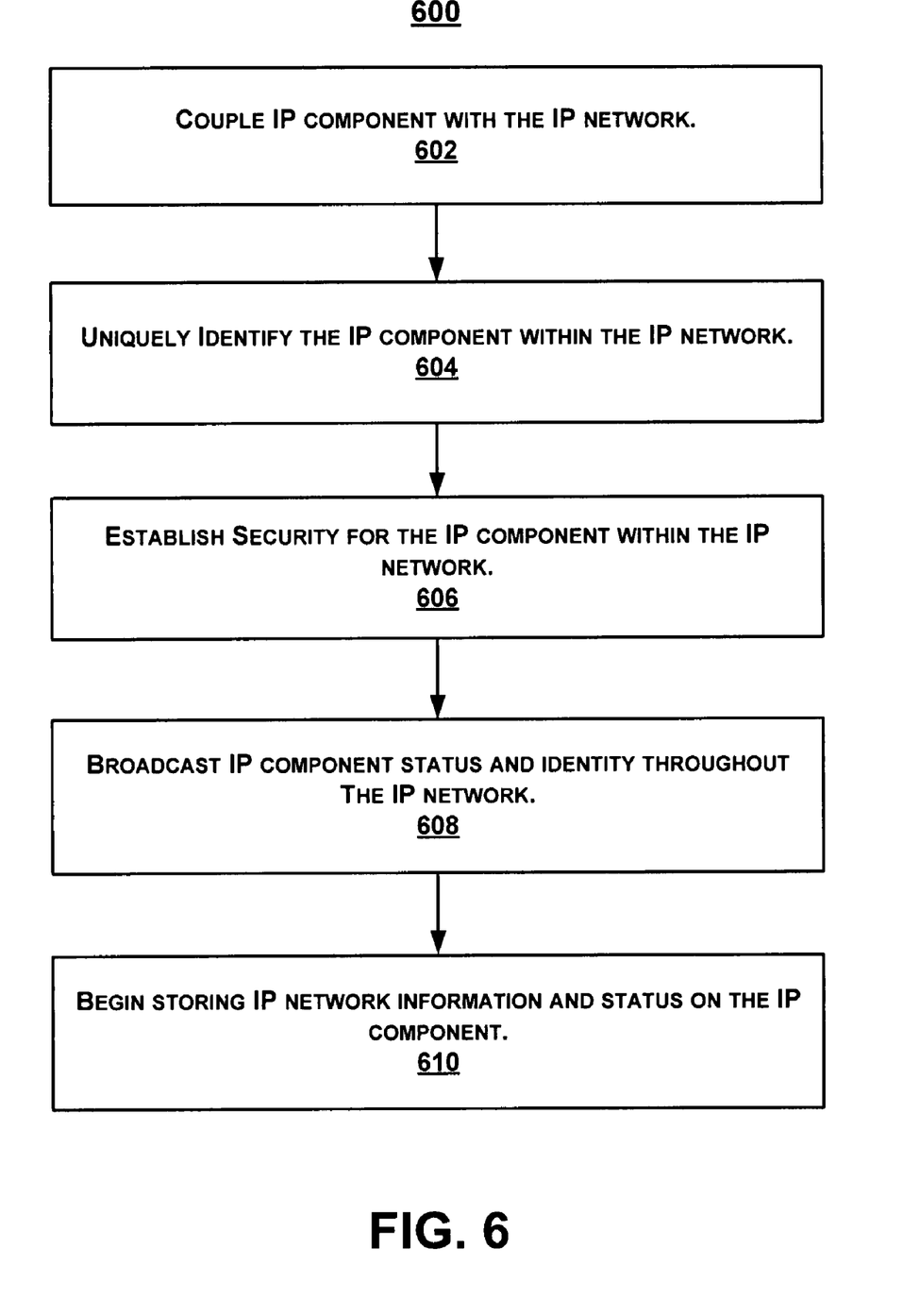
FIG. 6 is a flowchart of an exemplary method for installing a new device in a logically centralized physically distributed IP network-connected devices configuration in accordance with one embodiment of the present technology.

With reference now to FIG. 6, a flowchart 600 of an exemplary method for installing a new device in a logically centralized physically distributed IP network-connected devices configuration 200 is shown in accordance with one embodiment of the present technology.

Referring now to 602 of FIG. 6, one embodiment couples an $n^{th}$ device to the IP network-connected devices configuration 200. In general, the coupling of the $n^{th}$ device with the IP network-connected devices configuration 200 is performed by establishing an introduction between the $n^{th}$ device and the IP network-connected devices configuration.

For example, when a new device is introduced to IP network-connected devices configuration 200, a formal admissions ceremony may be performed before the device is allowed to participate in IP network-connected devices configuration 200's Lifeboard. In one embodiment, the admissions ceremony performs a mutual introduction: it introduces the new device to IP network-connected devices configuration 200, and also introduces IP network-connected devices configuration 200 to the new device. In one embodiment, any of the plurality of well-known methods for introducing a device to an IP network-connected devices configuration may be utilized.

However, in one embodiment, the admissions process may have the following characteristics. First, the admission process should be secure, that is, to a level of risk deemed reasonably acceptable to the designers of the admissions ceremony. In other words, the act of admitting a new device into IP network-connected devices configuration 200 will not be intercepted or otherwise altered by an attacker. In one embodiment, such a secure admissions process involves the transfer of information from the new device to an already-admitted device by some out-of-band (i.e.: non-network) means.

Referring now to 604 of FIG. 6, one embodiment uniquely identifies the $n^{th}$ device within the IP network-connected devices configuration 200. For example, in one embodiment, each Lifeboard device will receive a uniform resource identifier (URI) by which it can be uniquely named over space and time.

Referring now to 606 of FIG. 6, one embodiment establishes a security protocol for the $n^{th}$ device within the IP network-connected devices configuration 200. That is, in order to support robust security, it is important that each of the individual networked devices 230 be able to be uniquely identified cryptographically. To this end, in one embodiment, a public and private key of a device-unique RSA key pair is embedded in each of the networked devices 230. In one embodiment, these RSA key pairs in devices must be as unique as network MAC addresses. Thus, different instances of the same manufactured model of device should have their own unique RSA key pairs.

Referring now to 608 of FIG. 6, and in a manner similar to that described in 530 of FIG. 5, one embodiment disseminates the configuration information of the $n^{th}$ device to the plurality of networked devices 230 coupled with IP network-connected devices configuration 200. For example, the dissemination may be a multicast or the like.

Referring now to 610 of FIG. 6, and in a manner similar to that described in 540 of FIG. 5, one embodiment updates at least a portion of the IP network-connected devices configuration 200 on any of the plurality of networked devices 230 having a datastore thereon.

Thus, the present technology provides a system and method for providing a logically centralized physically distributed IP network-connected devices configuration. Moreover, the present technology provides a system and method for providing a logically centralized physically distributed IP network-connected devices configuration that is accessible by any device that can access a network such as the Internet. Moreover, the present technology allows an IP network-connected devices configuration to be managed centrally, while the actual IP network-connected devices configuration remains physically distributed and at least partially replicated. In so doing, a single device failure in the IP network-connected devices configuration will not result in a failure of the IP network-connected devices configuration because no single device maintains the IP network-connected devices configuration.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing a logically centralized physically distributed Internet protocol (IP) network-connected devices configuration, said computer-implemented method comprising:

receiving, at a network access device, configuration information regarding an IP network-connected devices configuration comprising said network access device and a plurality of networked devices, wherein said configuration information comprises audio or video device settings for a plurality of networked devices of said IP network-connected devices configuration and a power state of each of said plurality of networked devices;

disseminating said configuration information from the network access device to said plurality of networked devices of said IP network-connected devices configuration, wherein any of said plurality of networked devices having a datastore thereon stores at least a portion of said configuration information regarding other networked devices of said IP network-connected devices configuration for allowing storage of said configuration information regarding said IP network-connected devices configuration to be physically distributed and at least partially replicated on said plurality of networked devices, and each portion of said configuration information regarding other networked devices is stored with an associated timestamp related to when said portion of said configuration information was most recently updated;

multicasting a status request for an audio or video device setting of a specific networked device from said network access device to said plurality of networked devices;

receiving status information of said specific networked device including said audio or video device setting of said specific network device and a power state of said specific networked device and having an associated timestamp at said network access device from any of said plurality of networked devices storing at least a portion of said configuration information regarding said IP network-connected devices configuration;

comparing said status information of said specific network device received from said plurality of networked devices storing at least a portion of said configuration information regarding said IP network-connected devices configuration at said network access device;

resolving conflicts in said status information of said specific networked device based on status information received from said specific networked device when said specific networked device is in a powered on state and based on status information having a most recent associated timestamp when said specific networked device is in a powered off state; and multicasting updated status information of said specific networked device from said network access device to said plurality of networked devices after resolving conflicts in said status information.

2. The computer-implemented method of claim 1 further comprising:

receiving a multicast of status information of said specific networked device from any of said plurality of networked devices having a datastore thereon.

3. The computer-implemented method of claim 1 further comprising:

receiving status information of said specific networked device when said specific networked device is in a powered off state from one or more other networked devices of said plurality networked devices.

4. The computer-implemented method of claim 1 further comprising:

transmitting an adjustment to said audio or video device setting of said specific networked device from said network access device over said IP network-connected devices configuration.

5. The computer-implemented method of claim 4 further comprising:

multicasting said adjustment to said specific network device and to other networked devices of said plurality of networked devices storing at least a portion of said configuration information regarding said IP network-connected devices configuration.

6. The computer-implemented method of claim 1 further comprising:

utilizing said network access device of said IP network-connected devices configuration to select said specific networked device.

7. The computer-implemented method of claim 6 wherein said network access device comprises one of: a personal computer, a personal digital assistant, a mobile phone, a remote control, and a networked device coupled with said IP network-connected devices configuration.

8. The computer-implemented method of claim 1 further comprising:
coupling an $n^{th}$ device having a datastore to said IP network-connected devices configuration;
disseminating configuration information of said $n^{th}$ device to said plurality of networked devices of said IP network-connected devices configuration; and
storing at least a portion of said configuration information regarding said IP network-connected devices configuration on said datastore of said $n^{th}$ device.

9. A decentralized Internet protocol (IP) network accessor comprising:
a receiver for receiving a status request for an audio or video device setting of a first decentralized network-connected device in an IP network-connected devices configuration;
a requester for multicasting said status request to a plurality of decentralized network-connected devices coupled with said IP network-connected devices configuration, each of said plurality of decentralized network-connected devices having a datastore thereon storing at least a portion of configuration information regarding other decentralized network-connected devices of said IP network-connected devices configuration, wherein said configuration information comprises audio or video device settings for a plurality of decentralized network-connected devices of said IP networked-connected devices configuration and a power state of each of said plurality of decentralized network-connected devices, and each portion of said configuration information regarding other decentralized network-connected devices is stored with an associated timestamp related to when said portion of said configuration information was most recently updated;
a comparator for receiving status information of said first decentralized network-connected device including said audio or video device setting of said first decentralized network-connected device and a power state of said first decentralized network-connected device and having an associated timestamp in response to said status request from each of said plurality of decentralized network-connected devices having a datastore thereon storing at least a portion of configuration information regarding said IP network-connected devices configuration, wherein said comparator resolves conflicts in said status information of said first decentralized network-connected device based on status information received from said first decentralized network-connected device when said first decentralized network-connected device is in a powered on state and based on status information having a most recent associated timestamp when said first decentralized network-connected device is in a powered off state, wherein said comparator is not centrally located such that more than one said comparator may be utilized in conjunction with said decentralized network of connected devices; and
an adjuster for adjusting said audio or visual device setting of said first decentralized network-connected device after resolving conflicts in said status information and for multicasting updated status information of said first decentralized network-connected device to said plurality of decentralized network-connected devices.

10. The decentralized IP network-connected devices configuration accessor of claim 9 wherein said receiver receives said request regarding said first decentralized network-connected device from a remote IP network-connected devices configuration accessing device.

11. The decentralized IP network-connected devices configuration accessor of claim 9 wherein said first decentralized network-connected device comprises one of a television, a personal video recorder, a speaker, and a camera coupled with said IP network-connected devices configuration.

12. The decentralized IP network-connected devices configuration accessor of claim 9 wherein said adjuster communicates a wake-up to said first decentralized network-connected device when said first decentralized network-connected device is in a powered off state and multicasts an adjustment to said audio or video device setting of said first decentralized network-connected device to said plurality of decentralized network-connected devices.

13. The decentralized IP network-connected devices configuration accessor of claim 11 wherein said plurality of decentralized network-connected devices redundantly stores configuration information regarding said IP network-connected devices configuration.

14. The decentralized IP network-connected devices configuration accessor of claim 13 wherein each of said plurality of decentralized network-connected devices will perform an update on at least a portion of redundantly stored configuration information when multicasted status information of said first decentralized network-connected device has a timestamp that is newer than an associated timestamp of stored status information regarding said first decentralized network-connected device.

15. A computer-readable storage medium having computer-executable instructions stored thereon that, when executed, cause a computer system to perform a computer-implemented method for providing a logically centralized, physically distributed and replicated multicasting Internet protocol (IP) network, said computer-implemented method comprising:
disseminating configuration information to a plurality of networked devices of said IP network, wherein:
said configuration information comprises audio or video device settings for a plurality of networked devices of said IP network,
any of said plurality of networked devices having a datastore thereon stores at least a portion of said configuration information regarding other networked devices of said IP network for allowing storage of said configuration information regarding said IP network to be physically distributed and at least partially replicated on said plurality of networked devices, and
each portion of said configuration information regarding said other networked devices is stored with an associated timestamp related to when said portion of said configuration information was most recently updated;
accessing an Internet protocol (IP) media management protocol from a remote device;
selecting a first device coupled with said IP network;
multicasting a status request for an audio or video device setting of said first device from said remote device to said plurality of networked devices;
receiving a multicast of status information of said first device including said audio or video device setting of said first device and a power state of said first device and having an associated timestamp at said remote device from any of said plurality of networked devices storing at least a portion of said configuration information regarding said IP network;

resolving conflicts in said status information of said first device based on status information received from said first device when said first device is in a powered on state and based on status information having a most recent associated timestamp when said first device is in a powered off state;

performing an adjustment to said audio or video device setting of said first device after resolving conflicts in said status information received from said plurality of networked devices; and multicasting said adjustment to said audio or video device setting of said first device from said remote device to said plurality of networked devices over said IP network.

16. The computer-readable storage medium of claim 15 further comprising computer-executable instructions for:
utilizing a logically centralized IP media manager for accessing said physically distributed and replicated multicasting IP network.

17. The computer-readable storage medium of claim 16 further comprising computer-executable instructions for:
storing said logically centralized IP media manager on a remote server accessed over a network connection.

18. The computer-readable storage medium of claim 15 further comprising computer-executable instructions for:
communicating a wake-up to said first device when said first device is in a powered off state.

19. The computer-readable storage medium of claim 15 wherein said remote device comprises one of: a personal computer, a personal digital assistant, a mobile phone, a remote control and a networked device coupled with said IP network-connected devices configuration.

20. The computer-readable storage medium of claim 15 further comprising computer-executable instructions for:
coupling an $n^{th}$ device having a datastore to said physically distributed and replicated multicasting IP network;
multicasting configuration information regarding said $n^{th}$ device to any devices coupled with said physically distributed and replicated multicasting IP network; and
storing at least a portion of configuration information regarding said physically distributed and replicated multicasting IP network on said datastore of said $n^{th}$ device.

* * * * *